United States Patent
Shimizu et al.

(10) Patent No.: US 8,616,749 B2
(45) Date of Patent: Dec. 31, 2013

(54) PLANAR LIGHT-EMITTING DEVICE

(75) Inventors: Takahiro Shimizu, Fujiyoshida (JP); Koichi Hada, Fujikawaguchiko-machi (JP); Junji Miyashita, Fujiyoshida (JP); Kiyokazu Watanabe, Fujikawaguchiko-machi (JP); Makoto Yasuhara, Fujiyoshida (JP)

(73) Assignees: Citizen Electronics Co., Ltd., Yamanashi-Ken (JP); Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 13/432,413

(22) Filed: Mar. 28, 2012

(65) Prior Publication Data
US 2012/0250313 A1    Oct. 4, 2012

(30) Foreign Application Priority Data

Mar. 30, 2011   (JP) .............................. P2011-073824
Jan. 31, 2012   (JP) .............................. P2012-017894

(51) Int. Cl.
*F21V 33/00* (2006.01)

(52) U.S. Cl.
USPC ........................ 362/608; 362/612; 362/97.3

(58) Field of Classification Search
USPC ........................ 362/97.3, 608, 611, 612, 613
See application file for complete search history.

(56) References Cited

U.S. PATENT DOCUMENTS

| | | | |
|---|---|---|---|
| 6,481,130 B1* | 11/2002 | Wu ................................. | 40/546 |
| 7,350,951 B2* | 4/2008 | Sakai et al. ..................... | 362/555 |
| 7,980,746 B2* | 7/2011 | Tsuchiya et al. ............... | 362/609 |
| 2007/0171676 A1* | 7/2007 | Chang ............................ | 362/613 |
| 2008/0055928 A1* | 3/2008 | Arai ............................... | 362/609 |

FOREIGN PATENT DOCUMENTS

| | | |
|---|---|---|
| JP | 2008-60061 | 3/2008 |
| JP | 2008-300194 | 12/2008 |

* cited by examiner

*Primary Examiner* — Laura Tso
(74) *Attorney, Agent, or Firm* — Browdy and Neimark, PLLC

(57) ABSTRACT

A planar light-emitting device includes a first reflecting surface, a rectangular support disposed adjacent to the first reflecting surface, light sources each including a light-emitting surface and disposed along, at least one side portion of the rectangular support, and a lens including a light-receiving surface disposed to face the light-emitting surfaces of the light sources, and configured to introduce light emitted from the light sources into a space that is demarcated by at least the first reflecting surface and the rectangular support.

21 Claims, 9 Drawing Sheets

PLANAR LIGHT-EMITTING DEVICE

CROSS REFERENCE TO RELATED APPLICATION

This application is based on and claims the priority benefit of each of Japanese Patent Application No. 2011-73824, filed on Mar. 30, 2011 and No. 2012-17894, filed on Jan. 31, 2012, the disclosure of which is incorporated herein by reference in its entirety.

BACKGROUND OF THE INVENTION

1. Field of the Invention

The present invention relates to a planar light-emitting device used to illuminate liquid crystal display panels as backlights and so on.

2. Description of the Related Art

Liquid crystal display devices to display images are widely used for displays of notebook personal computers, car navigation devices, mobile-type personal computers, mobile phones, personal digital assistances, automated teller machines and so on. A backlight unit is used for the liquid crystal display device and configured to irradiate light to a liquid crystal panel of the liquid crystal display device from a back side of the liquid crystal panel to enhance brightness of the liquid crystal panel.

There is known a backlight of a type using a light-guiding plate that guides light emitted from a light source having a fluorescent tube or light-emitting diode elements (hereinafter referred to as LED elements) and emits the light toward a liquid crystal display panel. Otherwise, there also is proposed a hollow-type illumination device configured to emit, reflect and diffuse light in a space between a light-reflecting member and a light-emitting member, without using the light-guiding plate.

For example, as disclosed in JP 2008-60061A and JP 2008-300194A there is proposed a hollow-type illumination device in which a light-reflecting member is disposed on a bottom surface of a hollow unit case, a light-emitting member is disposed on a surface of the unit case facing the light-reflecting member, a hollow light-guiding area is formed by a space defined between the light-reflecting member and the light-emitting member, and a light source comprises a plurality of LED elements arranged on a printed circuit board is disposed adjacent to the hollow light-guiding area to emit light emitted from the light source to the hollow light-guiding area. In the hollow-type illumination device, an LED collimator to collimate light emitted from the light source is disposed in a light-emitting part of the light source.

However, in the hollow-type illumination device as disclosed in JP 2008-60061A and JP 2008-300194A, although the light emitted from the light source by use of the collimator lens is collimated and emitted toward the hollow light-guiding area, light which cannot be focused by the collimator lens is emitted toward an upper portion and a downward portion, there is a problem that use efficiency of the light is reduced. Therefore, in the hollow-type illumination device as disclosed in the documents mentioned above, in order to focus as much as light, the collimator lens has a complicate special shape. Consequently, there is a problem that part cost is increased. Even in the special collimator lens, there is a limitation to focus light and the light that cannot be focused is emitted upward and downward.

SUMMARY OF THE INVENTION

The present invention, proposed in view of the above-described problems, has an object of solving the above-described problems.

A planar light-emitting device may include a first reflecting surface, a rectangular support disposed adjacent to the first reflecting surface, light sources each including a light-emitting surface and disposed along, at least one side portion of the rectangular support, and a lens including a light-receiving surface disposed to face the light-emitting surfaces of the light sources. The lens may be configured to introduce light emitted from the light sources into a space that is demarcated by at least the first reflecting surface and the rectangular support.

Also, the rectangular support may include a cut portion that is disposed at and extends along a lower edge of the at least one side portion of the rectangular support. Furthermore, a second reflecting surface may be disposed at the cut portion on the lower surface of the at least one side portion of the rectangular support. The second reflecting surface may extends over a tip of a convex portion of the lens.

In addition, the first reflecting surface may include a downward slope and the second reflecting surface may include an upward slope. Also, the second reflecting surface may include a concave surface that is disposed above at least one of the light sources.

The rectangular support includes, in one embodiment, a frame shape with an opening that passes through an upper surface and a lower surface of the rectangular support.

The first reflecting surface includes a downward slope disposed at an area that is along the at least one side portion of the rectangular support and adjacent to lower portions of the light sources and the lens. The downward slope of the first reflecting surface slants downward toward the space that is demarcated by at least the first reflecting surface and the rectangular support. The downward slope may curve.

The second reflecting surface includes an upward slope disposed at an area that is along the at least one side portion of the rectangular support and adjacent to upper portions of the light sources and the lens. The upward slope of the second reflecting surface slants upward toward an interior of the space that is demarcated by at least the first reflecting surface and the rectangular support. The upward slope may curve.

DETAILED DESCRIPTION OF THE PREFERRED EMBODIMENTS

Figure 1:
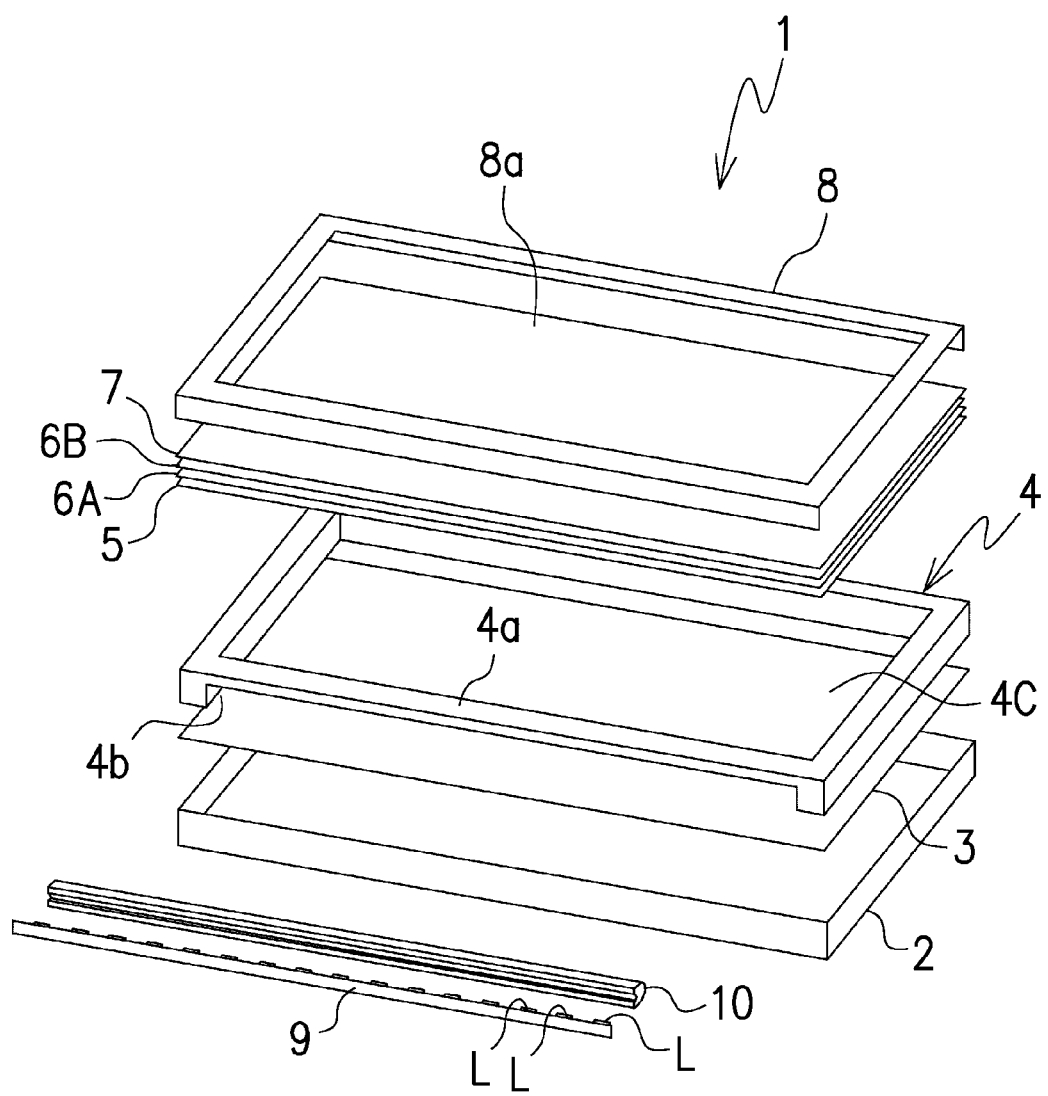
FIG. 1 is an exploded perspective view of a planar light-emitting device according to a first embodiment of the present invention.

Preferred embodiments of the present invention will be explained hereinafter in detail with reference to the accompanying drawings.

A planar light-emitting device according to the present invention includes a first reflecting surface 3, a rectangular support 4 disposed adjacent to the first reflecting surface 3, a plurality of light sources L each including a light-emitting surface and disposed along, at least one side portion 4a of the rectangular support 4, and a lens 10 including a light-receiving surface disposed to face the light-emitting surfaces of the light sources L, and configured to introduce light emitted from the light sources L into a space 15 that is demarcated by at least the first reflecting surface 3 and the rectangular support 4. The space 15 is a hollow structure in the planar light-emitting device to guide light.

More specifically, a first embodiment of the planar light-emitting device according to the present invention is described with reference to FIGS. 1 to 4.

Here, in each drawing used for the following description, it should be noted that a size of each of parts of the planar light-emitting device may be changed to facilitate understanding of the parts, as necessary.

Figure 2:
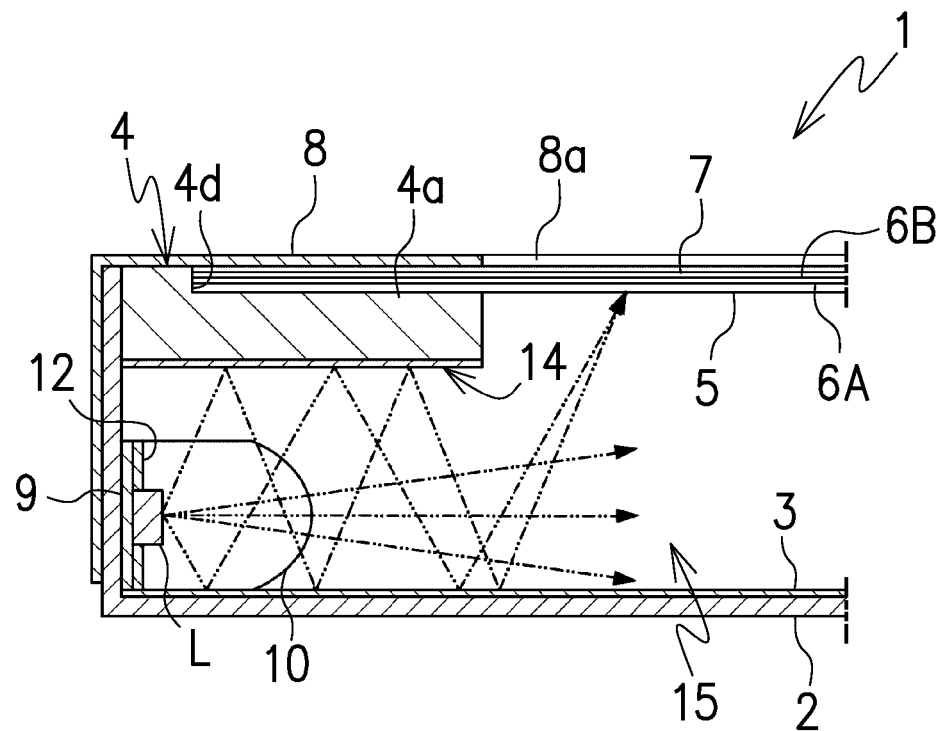
FIG. 2 is an enlarged partial sectional view of the planar light-emitting device shown in FIG. 1, showing a portion where a plurality of light sources with a lens are disposed between a first reflecting surface and a second reflecting surface.
Figure 3:
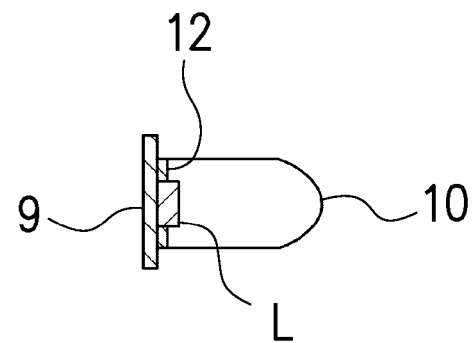
FIG. 3 shows a sectional view of the light sources with the lens mounted on a flexible printed circuit board.
Figure 4:
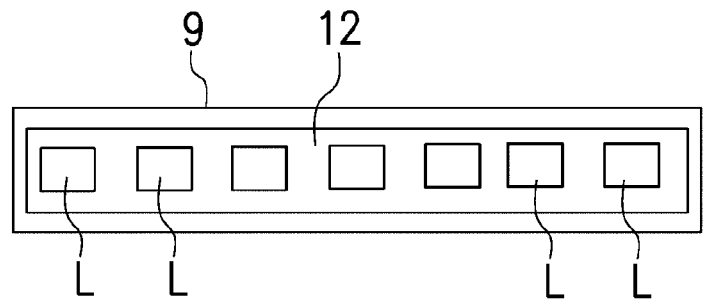
FIG. 4 is a front view showing the light sources mounted on the flexible printed circuit board on which a reflection layer is arranged around the light sources.

The planar light-emitting device 1 according to the first embodiment is used for, for example, a backlight of a liquid crystal display panel. As shown in FIGS. 1 and 2, the rectangular support 4 includes a frame shape with an opening 4c that passes through an upper surface and a lower surface of the rectangular support 4, and the rectangular support includes a cut portion 4b that is disposed at and extends along a lower edge of the at least one side portion of the rectangular support 4. In other words, the cut portion 4b is formed at a peripheral side surface of the rectangular support. The light sources L and the lens 10 are disposed in the cut portion 4b, in other words, disposed under the at least one side portion of the rectangular support 4. In this embodiment, the circuit board 9 is disposed at a position to close the cut portion 4b of the rectangular support 4 and the light sources L is arranged in a line to face the space 15 on a front surface of the circuit board 9, and the lens 10 is disposed on the front surface of the circuit board 9 to cover the light sources L from above the light sources L arranged in the line on the front surface of the circuit board 9. The lens 10 extends along the line of the light sources L and includes a light-receiving surface with a groove that extends along the line of the light sources L to fit the light sources L in, and a convex shape that extends along the line of the light sources L and is disposed at an opposite side of the light-receiving surface. A tip of the convex shape of the lens 15 points to the space 15 in the planar light-emitting device and the lens 15 collimate or collect light emitted from the light sources L and transmits the collimated or collected light toward an inward of the space 15.

The planar light-emitting device 1 includes a bottom case 2 that includes a box shape with an upper portion opened (see FIG. 1). In the bottom case 2, the first reflecting surface 3 is disposed (see FIG. 2). The rectangular support 4 is disposed on the first reflecting surface 3 in the bottom case 2, and the opening 4c of the rectangular support 4 is positioned above the first reflecting surface 3. At least one optical sheet is placed on the rectangular support 4 to cover the opening 4c of the rectangular support 4 and to close the space 15 from above the space 15. For example, in the first embodiment, the at least one optical sheet includes a diffusion sheet 5 disposed on an upper surface of the rectangular support 4 to cover the opening 4c and the first reflecting surface 3 and close the space 15 from above. The at least one optical sheet may further include a first prism sheet 6A and a second prism sheet 6B that are layered on the diffusion sheet 5, and also may include a polarization sheet 7 that is disposed on these first and second prism sheets 6A and 6B (see FIG. 2). Meanwhile, a front case 8 that includes a frame shape maybe disposed on the at least one optical sheet, for example, on the polarization sheet 7. As the front case 8 includes an opening 8a that passes through an upper surface and a lower surface of the rectangular support, the opening 8a of the front case transmits light through the at least one optical sheet and the opening 8a of the front case is configured to be a light-emitting area of the planar light-emitting device 1. The plurality of light sources L are arranged in the line on the circuit board along the one side portion of the rectangular support 4 and emit light through the lens 10 toward the space 15 that is demarcated by at least the first reflecting surface 3 and the rectangular support 4 and the at least one optical sheet. The circuit board 9 may be a strip of flexible printed circuit board 9. In the first embodiment, the first reflecting surface 3 is formed by a reflective sheet.

The rectangular support 4 has a rectangular frame shape and is preferably made of a white resin to reflect light effectively. However, the rectangular support 4 also can be made of another material such as a metal and so on.

The at least one optical sheet may be adhered to the upper surface of the rectangular support 4 around the opening 4c of the support 4, for example, by a double faced adhesive tape (not shown). Also, a step 4d may be provided on an upper surface of the rectangular support 4 around the opening 4c. The step 4d of the rectangular support can position and supports a peripheral portion of the at least one optical sheet, and even if a plurality of optical sheets are provided, the upper surface of the rectangular support 4 and the top of the optical sheets can be flush with each other.

As shown in FIG. 2 and mentioned above, since the light sources L are arranged in a line below the one side portion 4a of the rectangular support, the one side portion 4a of the support 4 may be used as a light-shielding portion in a direction just above the light sources L.

As mentioned above, the first reflecting surface 3 is a flat surface or a flat reflecting sheet disposed in the bottom case 2. In this first embodiment, a second reflecting surface 14 is disposed on a lower surface of the one side portion 4a of the rectangular frame. The second reflecting surface 14 includes a flat surface disposed parallel to the first reflecting surface 3. The light sources L with the lens 10 provided in front of the light sources L at the cut portion 4b between the first reflecting surface 3 and the second reflecting surface, and the second reflecting surface includes a rectangular shape that extends on and along the lower surface of the one side portion 4a of the rectangular frame and also extends inward the space 15 at least over the tip of the convex portion of the lens 10.

Without a light-guiding plate, a planar light-emitting device according to the present invention use the space 15 or the hollow structure in the planar light-emitting device, and the lens 10, the first reflection surface 3 and the second reflecting surface 14 are designed to collect and reflect light effectively toward the space 15.

LED elements may be used for the plurality of light sources L and a reflection layer 12 may be provided on the front surface of the circuit board 9 around the light sources L. The reflection layer 12 is, for example, a tape sheet. The reflection layer 12 with openings at positions where the light sources L are mounted may be adhered on the front surface of the printed circuit board 9. The light sources L in the first embodiment may be white light-emitting light sources.

In this case, for example, blue LED elements (wavelength (λ): 470 to 490 nm) or ultra-violet LED elements (wavelength (λ): lesser than 470 nm) with YAG phosphor mixed in a resin may be used. The YAG phosphor converts a part of blue light or a part of ultraviolet light emitted from the LED elements into yellow light. White light is a mixed effect of the blue or ultraviolet light and the yellow light in human eyes. Here, without being limited to the above, RGB light-emitting elements and other light sources can be used for the white color light sources.

Also, the circuit board 9 that may be a flexible printed circuit board is disposed at a position to close the cut portion 4b of the rectangular support 4 and a rear surface of the circuit board 9 is adhered to one of inner peripheral side surface of the bottom case through a heat transfer tape (not shown) to one of inner wall surfaces of the bottom case 2. The heat transfer tape is used for retention of the flexible printed circuit board 9 and heat release of the light sources L.

In addition, a white color resist is preferably used in the circuit board 9 to reflect light thereon effectively.

As the first reflecting surface 3, the second reflecting surface 14 and the reflection layer 12, a metallic plate, film, foil and so on, for example, a silver-vapor deposition film, an aluminum metallic-vapor deposition film, white color sheet and so on may be used. In the first embodiment, the first reflecting surface 3, the second reflecting surface 14 and the reflection layer 12 are formed by, for example, a reflection film having a multi-layer film structure using a polyester-system-resin.

The first prism sheet 6A is disposed on the diffusion sheet 5, and the second prism sheet 6B is disposed on the first prism sheet 6A. Each of the first prism sheet 6A and the second prism sheet 6B may be a transparent sheet to focus light from an upper surface of the diffusion sheet 5 and includes prisms that are a plurality of parallel ridge lines, provided on the upper surface of each of the first prism sheet A and the second prism sheet B. The plurality of parallel ridge lines of the first prism sheet 6A are set to be parallel to the cut portion 4a that extends along one side portion of the frame 4 or parallel to the line of the light sources L.

On the other hand, the plurality parallel ridge lines of the second prism sheet 6B prisms are set to be perpendicular to the cut portion 4a that extends along one side portion of the frame 4 or parallel to the line of the light sources L. That is to say, the prisms of the first prism sheet 6A and the prisms of the second prism sheet 6B are arranged to intersect each other's prisms. For example, a BEF sheet (Brightness Enhancement Firm: Name of Product) made by Sumitomo Three M Co., Ltd is used as the first prism sheet 6A and the second prism sheet 6B.

The polarization sheet 7 is a reflective polarizing film transmitting only one of a component S and a component P of light and reflecting the other. The reflected light component returns to the first reflecting surface 3 and is converted, while entering the reflective polarizing film again, into a light component transmitting the reflective polarizing film. For, example, a D-BEF sheet (name of product) made by Sumitomo Three M Co., Ltd is applicable to the reflective polarizing film. An absorptive polarizing film may be used as the polarization sheet 7.

The lens 10 may be a bar-shaped collimator lens or a collecting lens with a groove that extends along the line of the light sources L to fit the light sources L in, and a convex portion that extends along the line of the light sources L and is disposed at an opposite side of the light-receiving surface of the lens 10. The lens 10 can be easily formed by extrusion with a high productivity and a low cost. The collimator lens collimates light toward the inside of the space 15 and the collecting lens collect or focus light toward the inside of the space 15 of the planar light-emitting device. The lens 10 makes it possible to correct light directions of light emitted from the plurality of light sources L, for example, at a light-emitting angle of about 10 degrees in a traveling direction of the light. The collimated or collected light is reflected on the first reflecting 3 and the second reflecting surface 14, and finally the reflected light is, transmitted through the at least one optical sheet disposed at the opening 4c of the rectangular frame 4 to opening 8a of the front case 8 or the light-emitting area of the planar light-emitting device 1. The at least one optical sheet such as the first prism sheet 6A, the second prism sheet 6B and the polarization sheet 7 correct direction of light upwardly.

In the planar light-emitting device structured as mentioned above, because the second reflecting surface 14 extends in a direction toward an inner portion of the space 15 over the tip of convex portion of the lens 10, lights emitted obliquely upward and obliquely downward without being collimated or collected by the convex portion of the lens 10 can be reflected on the first reflecting surface and the second reflecting surface 14 and directed to the space 15.

Meanwhile, in the conventional backlight using a light-guiding plate, because light emitted from light sources is entered the light-guiding plate, the light sources and an end surface of the light-guiding plate are disposed at close positions each other. On the contrary, in the planar light-emitting device 1 according to the first embodiment, because the backlight has no light-guiding plate and a hollow structure, and the space 15 is provided in front of the light sources L and the lens 10, it is possible to secure a space providing the second reflecting surface 14.

In addition, because a part of the flexible printed circuit board 9 about each of the light sources L is formed in the reflection surface, light which is reflected on the lens 10 and other portions and returns to the printed circuit board 9 can be reflected again on the reflection layer 12 forward, thereby improving use efficiency of light.

As mentioned above, the frame 4 can supports the outer circumferential portion of the at least one optical sheet such as a diffusion sheet 5, it is possible to achieve exclusion of a light-guiding plate from the planar light-emitting device and a reduction of weight of the supporting frame, while achieving brightness as a light-emitting device.

Furthermore, because the one side portion 4a of the support 4 is used as the light-shielding portion to shield light emitting in a direction right above the light sources L and the lower surface of the one side portion 4a forms as the second reflecting surface 14, it is possible to easily dispose a reflection surface above the lens 10.

Next, second to ninth embodiments of the planar light-emitting device according to the present invention are described hereinafter with reference to FIGS. 5 to 12.

Here, in the following embodiments, identical reference numbers are attached to similar parts to that in the aforementioned first embodiment, the duplicate descriptions are omitted. In figures used for a description of each of the third to ninth embodiments, the optical sheet and the front case are omitted for showing structures thereof easily.

Figure 5:
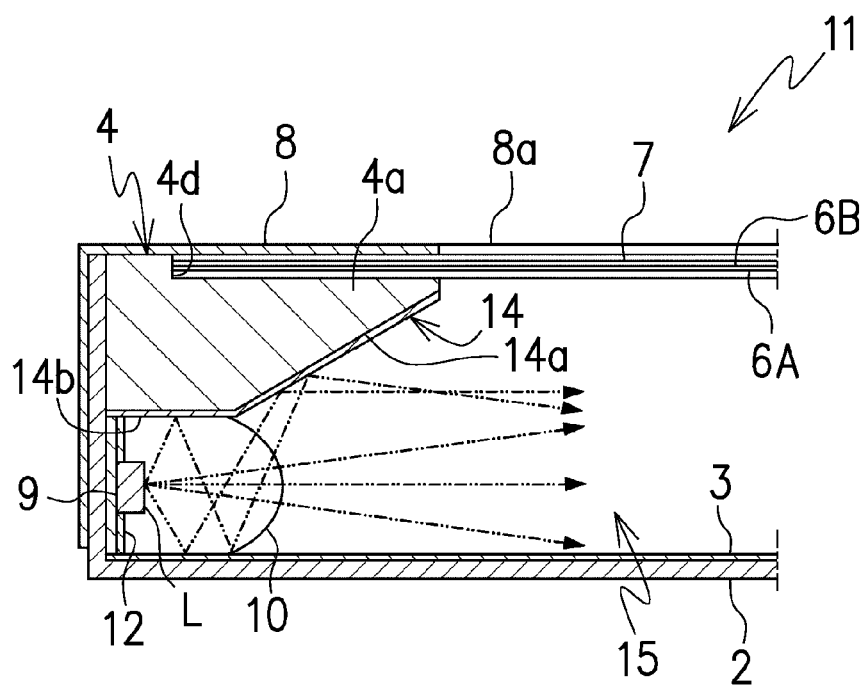
FIG. 5 is an enlarged partial sectional view of a planar light-emitting device according to a second embodiment of the present invention, showing a portion where a plurality of light sources with a lens provided in front of the light sources between a first reflecting surface and a second reflecting surface.

FIG. 5 illustrates a planar light-emitting device according to the second embodiment of the present invention.

The planar light-emitting device 11 in this embodiment differs from the first embodiment in that the second reflecting surface 14 includes an upward slope disposed at an area that is along the at least one side portion of the rectangular support and adjacent to upper portions of the light sources L and the lens 10, and other basic structures of the second embodiment are the same as the first embodiment. The upward slope 14a is disposed at an area adjacent to the convex portion of the bar-shaped lens 10 and slopes upward toward the upper surface of the frame adjacent to the opening 4a of the rectangular support 4. Here, the second reflecting surface 14 includes a flat surface 14b provided at a position above the light sources L and a part of the lens 10. The upward slope 14a starts to slope above around the convex portion of the lens 10 and continuously slopes from an inner edge of the flat surface 14b toward the upper surface of the rectangular frame 4 adjacent to the opening 4c. The flat surface 14b and the upward slope 14a are provided along the line of the light sources L or the cut portion 4b of the rectangular support. As the second reflection surface 14 is provided on the flat surface 14b and the upward slope 14, light emitted obliquely upward without through the convex portion of the lens 10 can be effectively reflected on the second reflecting surface of the flat surface 14b, and returned to the space 15, and thereafter, reflected on the first reflecting surface 3, transmitted through the at least one optical sheet such as the diffusion sheet 5 and emitted upward, and thus, the brightness of the finally emitted light can be improved. Because light directing to the right above the light sources L can be reflected on the second reflecting surface 14 to direct the inner portion of the space 15, it is possible to enhance a distribution of brightness in the light-emitting area of the planar light-emitting device.

Figure 6:
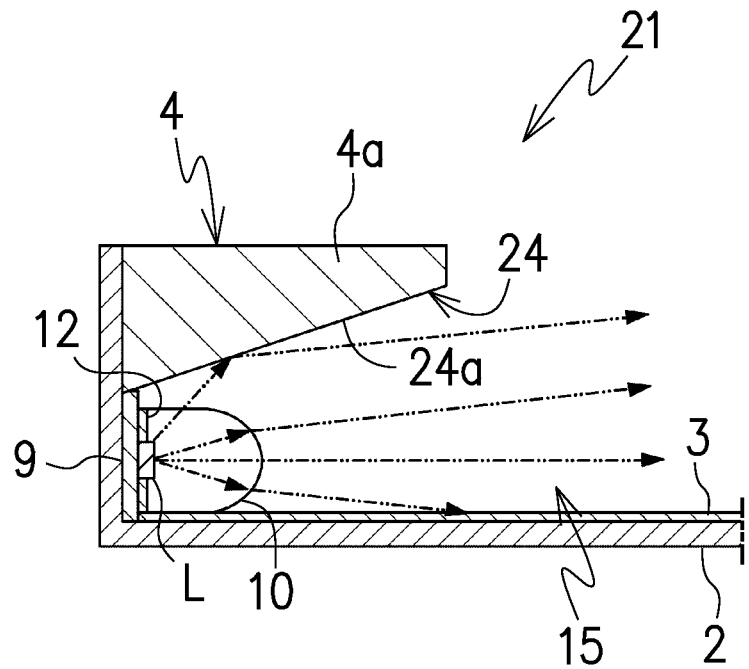
FIG. 6 is an enlarged partial sectional view of a planar light-emitting device according to a third embodiment of the present invention, showing a portion where a plurality of light sources with a lens provided in front of the light sources between a first reflecting surface and a second reflecting surface.

FIG. 6 illustrates a planar light-emitting device according to a third embodiment of the present invention.

The planar light-emitting device 21 in this embodiment differs from the second embodiment in that the lower surface of the one side portion 4a of the rectangular support 4 is the upward slope 24a and also the second reflection surface. The upward slope 24a slants from a position adjacent to the circuit board 9 toward the upper surface of the support 4 adjacent to the opening 4c of the support 4. In this embodiment a reflection sheet as shown in other embodiments is not attached to the upward slope 24a. Other basic structures are similar to the second embodiment.

In the planar light-emitting device 21 according to the third embodiment, because the upward slope 24a slants from a position adjacent to the circuit board 9 toward the upper surface of the support 4 adjacent to the opening 4c of the support 4, light emitted upward even at a position adjacent to the circuit board 9 can also be reflected on the upward slope 24a to direct to the space 15, and thus upward light emitted from the light sources L can be effectively used.

Even if a white color reflection sheet is not provided on the upward slope 24a, the lower surface of the one side portion of the support that is made of a white color material can be a second reflecting surface. As explained above, the lower surface of the one side portion can be the second reflecting surface, and the reflection sheet as shown in the first embodiment can be omitted.

Figure 7:
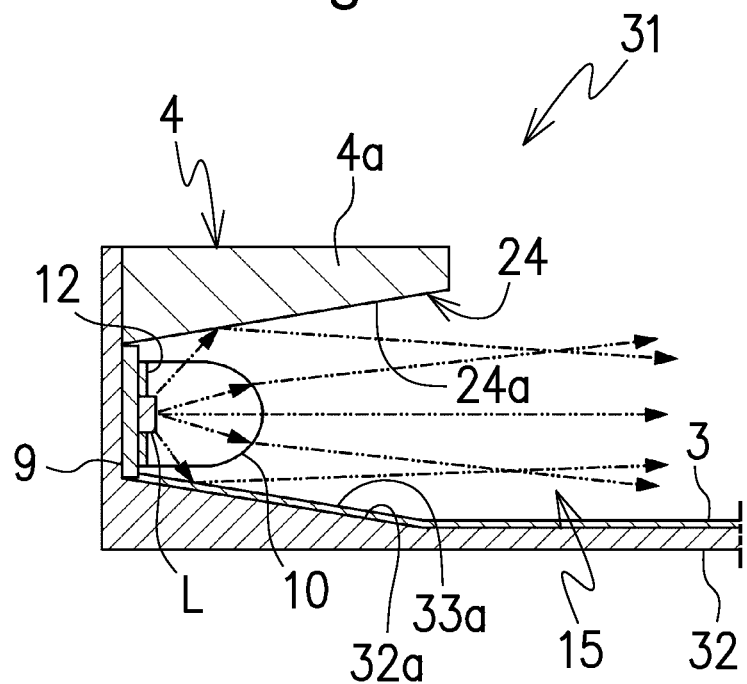
FIG. 7 is an enlarged partial sectional view of a planar light-emitting device according to a fourth embodiment of the present invention, showing a portion where a plurality of light sources with a lens provided in front of the light sources between a first reflecting surface and an upward slope of a rectangular support.

FIG. 7 illustrates a planar light-emitting device according to a fourth embodiment of the present invention.

The planar light-emitting device 31 in this embodiment differs from the third embodiment in that not only the lower surface of the one side portion 4a that is the upward slope 24a is provided as the second reflecting surface 24, but also, a downward slope 33a is provided as a part of the first reflecting surface 3. The downward slope 33a extends symmetrical to the second reflecting surface 24 centering on the light sources L that are arranged in the line along the cut portion 4b of the one side portion 4a of the rectangular support 4. Other basic structures of the fourth embodiment are the same as that in the third embodiment. The downward slope 33a slants downward with distance from the light sources L toward the space 15 and a reflection sheet 32a is disposed on the downward slope 33a.

In the planar light-emitting device 31 in this embodiment, because the downward slope 33a of the first reflecting surface 3 below the lens 10 is provided, it is possible to reflect an emitted part below the lens 10, of light which cannot be focused into the inner portion of the space 15 by the lens 10, on the downward slope 33a and direct it into the forward inner portion of the space 15, thereby further improvement in the use efficiency of the light can be accomplished.

Consequently, in this embodiment, not only the upward slope 24a as the second reflecting surface 24, positioned above the lens 10, but also the downward slope 33a of the first reflecting surface 3, positioned below the lens 10 is employed to allow the light emitted in upward and downward directions of the lens 10 to direct to space 15 efficiently.

Meanwhile, in the fourth embodiment, the bottom surface 32a of the bottom case 32 facing the lens 10 slants from the position adjacent to the circuit board 9 to form the downward slope 33a of the first reflecting surface 3, but also a downward slope may be formed at the other side of the bottom case 32, adjacent to an opposite side to the one side portion of the rectangular support 4. In this case, even at an area of the space away from the light sources L, brightness can be enhanced by the reflection on such a downward slope.

Figure 8:
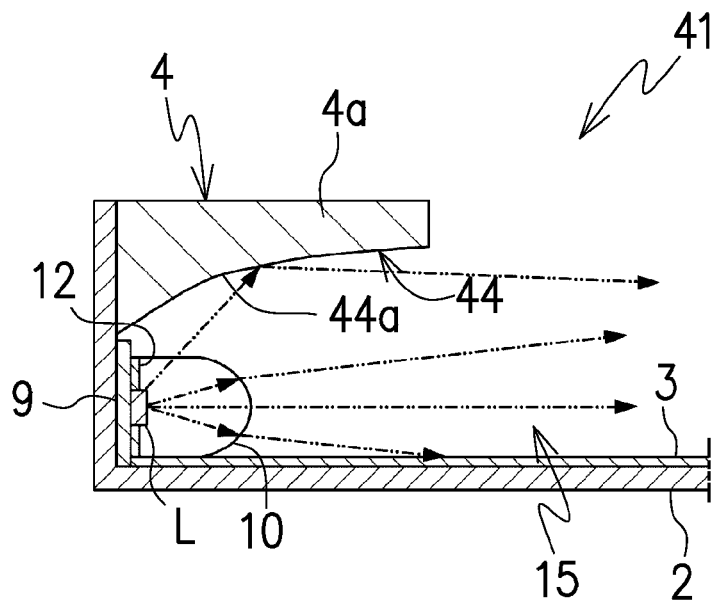
FIG. 8 is an enlarged partial sectional view of a planar light-emitting device according to a fifth embodiment of the present invention, showing a portion where a plurality of light sources with a lens provided in front of the light sources between a first reflecting surface and an upward slope that curves.

FIG. 8 illustrates a planar light-emitting device according to a fifth embodiment of the present invention.

The planar light-emitting device 41 in this embodiment differs from the third embodiment in that a second reflecting surface 44 formed on the lower surface of the one side portion 4a of the support 4 includes an upward slope 44a that curves, and more specifically, the curved upward slope 44a includes a curvature that gradually reduces with distance from the light sources L toward the space 15. Other basic structures of the fifth embodiment are the same as in the third embodiment.

Consequently, light even emitted directly upward and downward from the light sources L can be corrected toward the inside of the space 15. In the planar light-emitting device 41 in the fifth embodiment, it is possible to direct the upward light emitted from the light sources L adjacent to the circuit board 9 toward the inside of the space 15 by reflecting the light on a curved surface with a higher curvature. The curvature of the upward slope 44a is higher at the position adjacent to the light sources L than the curvature at the position adjacent to the opening 4c of the support 4. In addition, because emitted light separated slightly from the base end has a small light-emitting angle, it is possible to guide the emitted light into the interior of the space by reflecting the emitted light on a curved surface having a small curvature, which is placed at a position in front of the upward slope 44a. In this way, it is possible to guide the light to the space 15 efficiently in accordance with a light-emitting angle of light emitted from the lens 10.

Figure 9:
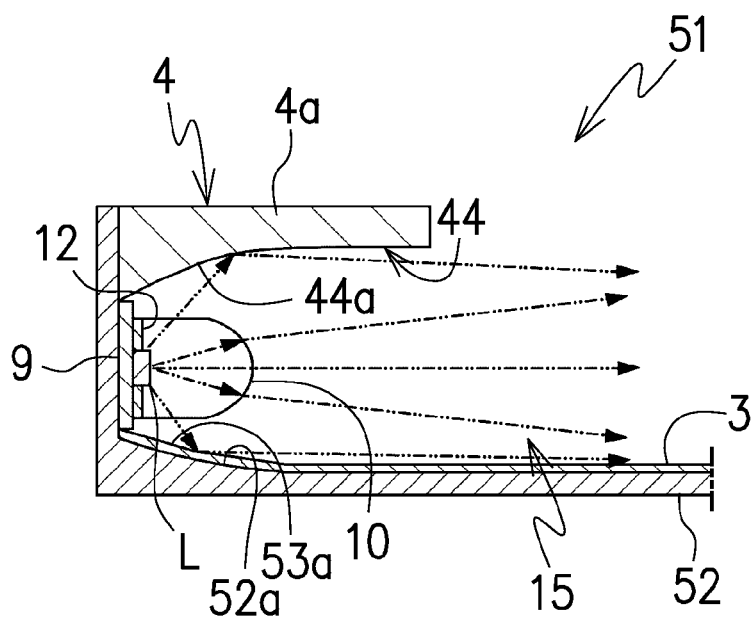
FIG. 9 is an enlarged partial sectional view of a planar light-emitting device according to a sixth embodiment of the present invention, showing a portion where a plurality of light sources with a lens provided in front of the light sources between a first reflecting surface that curves and an upward slope of a rectangular support that curves.

FIG. 9 illustrates a planar light-emitting device according to a sixth embodiment of the present invention.

The planar light-emitting device 51 in this embodiment differs from the fifth embodiment in that a downward slope 53a is provided at the first reflecting surface 3 at a position adjacent to the light sources L and the lens 10. More specifically the downward slope 53a curves and a curvature gradually decreases with distance from the light sources and the lens toward the interior of the space 15. Other basic structures of the fifth embodiment are the same as in the fifth embodiment. That is to say, in the sixth embodiment, a downward slope 53a is a downward bottom surface 52a of a bottom case 52 and a reflection sheet attached to the bottom surface 52a of the bottom case 52.

Consequently, in the planar light-emitting device 51 in the sixth embodiment, because, not only the upward slope 44a is provided as the second reflecting surface 44, but also the downward slope 53a that curves is provided as the first reflecting surface 3, light directed upward and downward from the lens 10 is reflected on both the upward slope 53a and the downward slope 53a to direct the reflected light to the interior of the space 15 efficiently.

Figure 10A:
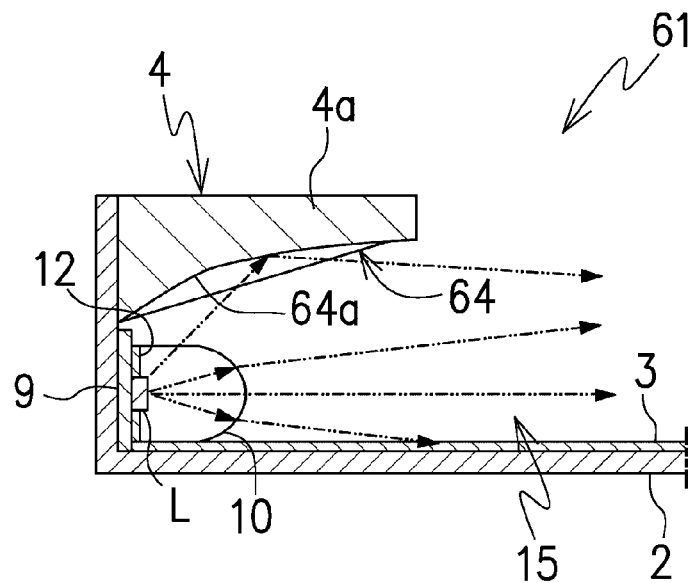
FIG. 10A is an enlarged partial sectional view of a planar light-emitting device according to a seventh embodiment of the present invention, showing a portion where a plurality of light sources with a lens provided in front of the light sources between a first reflecting surface and an upward slope of a rectangular support that curves
Figure 10B:
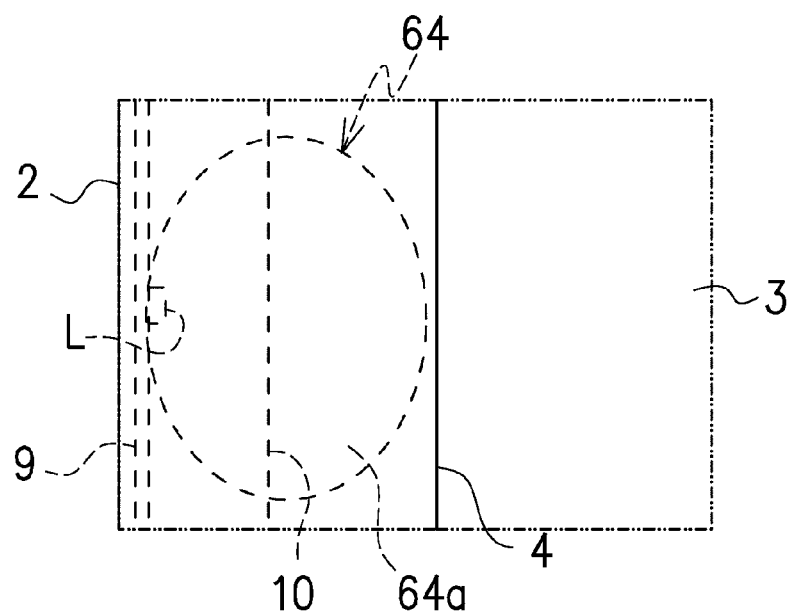
FIG. 10B is an enlarged partial plan view of the planar light-emitting device according to the seventh embodiment of the present invention, showing a portion viewed from above one of the plurality of light sources.

FIG. 10A shows a sectional view of a planar light-emitting device according to a seventh embodiment of the present invention, and FIG. 10B shows a plan view of the planar light-emitting device.

The planar light-emitting device 61 in this embodiment includes a second reflecting surface 64 that is the lower surface of the one side portion 4a of the support 4, and the lower surface of the one side portion 4a of the support 4 includes a concave surface that is a dome shape or elliptical shape as viewed from a top plan, and the concave surface is provided above each light source L, as shown in FIG. 10B. In addition, a concave surface of each of a plurality of second reflecting surfaces 64 includes an upward slope 64a formed to have a curve toward the interior of the space 15 as shown in the fifth embodiment. The seventh embodiment differs from the fifth embodiment in the aforementioned maters. Other basic structures of the seventh embodiment are the same as in the fifth embodiment.

Consequently, in the seventh embodiment, because the second reflecting surface 64 having the dome-shaped concave surface is provided every each light source L, and each concave surface is configured to form the upward slope 64a, light emitted laterally obliquely upward from each of the light sources L through the lens 10 is reflected on the second reflecting surface 64 toward the interior of the space 15, and thus the light can be efficiently used.

Figure 11A:
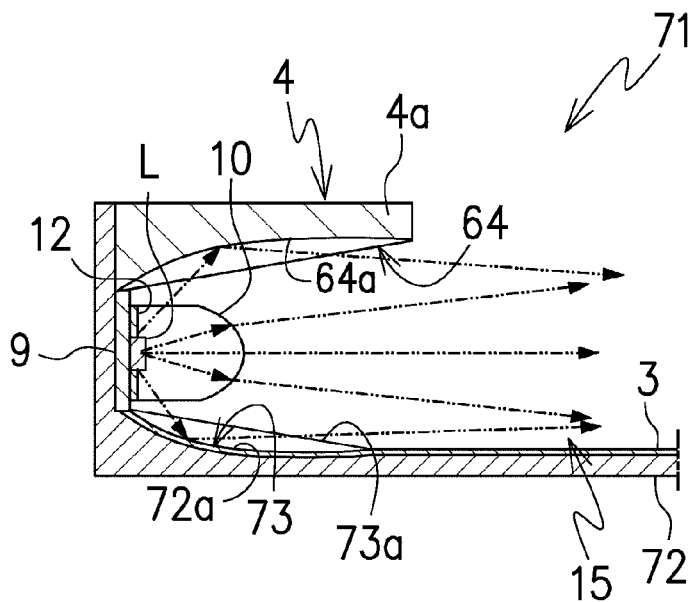
FIG. 11A is an enlarged partial sectional view of a planar light-emitting device according to an eight embodiment of the present invention, showing a portion where a plurality of light sources with a lens provided in front of the light sources between a first reflecting surface and an upward slope of a rectangular support that curves.
Figure 11B:
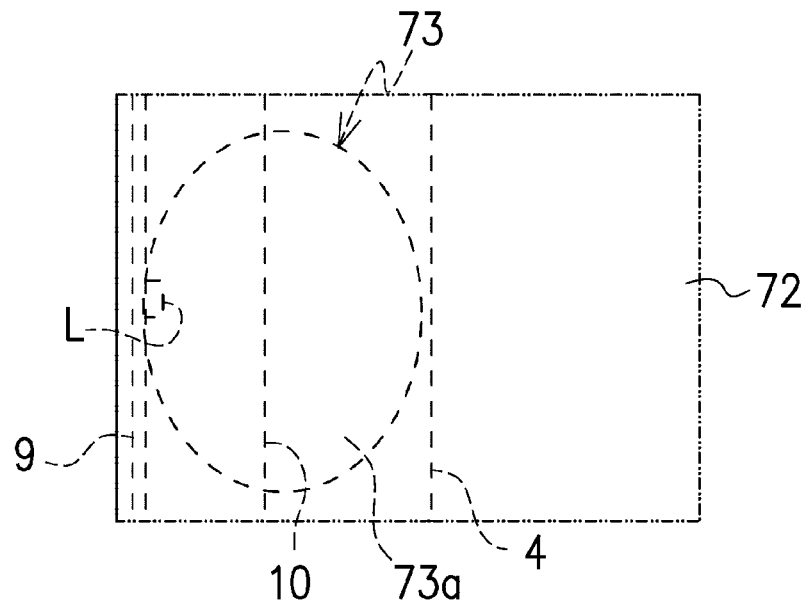
FIG. 11B is an enlarged partial plan view of the planar light-emitting device according to the eighth embodiment of the present invention, showing a portion viewed from above one of the plurality of light sources.

FIG. 11A shows a sectional view of a planar light-emitting device according to an eighth embodiment of the present invention and FIG. 11B shows a bottom view of the planar light-emitting device.

The planar light-emitting device 71 in this embodiment differs from that in the seventh embodiment in that the first reflecting surface 3 includes a dome-shaped concave surface 73 (elliptical shape as viewed from a top plan) provided every each light source L, and a plurality of dome-shaped concave surfaces 73 are provided along a direction where the light sources L are arranged. These concave surfaces 73 include downward slopes 73a formed to have curves toward the interior of the space 15. Other basic structures of the eighth embodiment are the same as in the seventh embodiment.

That is to say, in the eighth embodiment, the dome-like concave surface 73 is formed on a bottom surface 72a of a bottom case 72 close to the lens 10, every each light source L, and the downward slopes 73a of the first reflecting surface 3 are formed by attaching a reflection sheet to which a curved process is applied, along the concave surfaces 73. The downward slopes 73a are provided at positions approximately facing the upward slope 64a of the second reflecting surface 64.

Consequently, in the planar light-emitting device 71 in the eighth embodiment, by providing the second reflecting surface 64 including the upward slope 64a formed by the dome-shaped concave surface and the first reflecting surface 3 including the curved downward slopes 73a, at the upward and downward positions of the lens 10 every each light source L, light emitted laterally obliquely upward and laterally obliquely downward from the lens 10 is reflected on the second reflecting surface 64 and the first reflecting surface 3, respectively, thereby the reflected light can be directed into the interior of the space 15.

Figure 12:
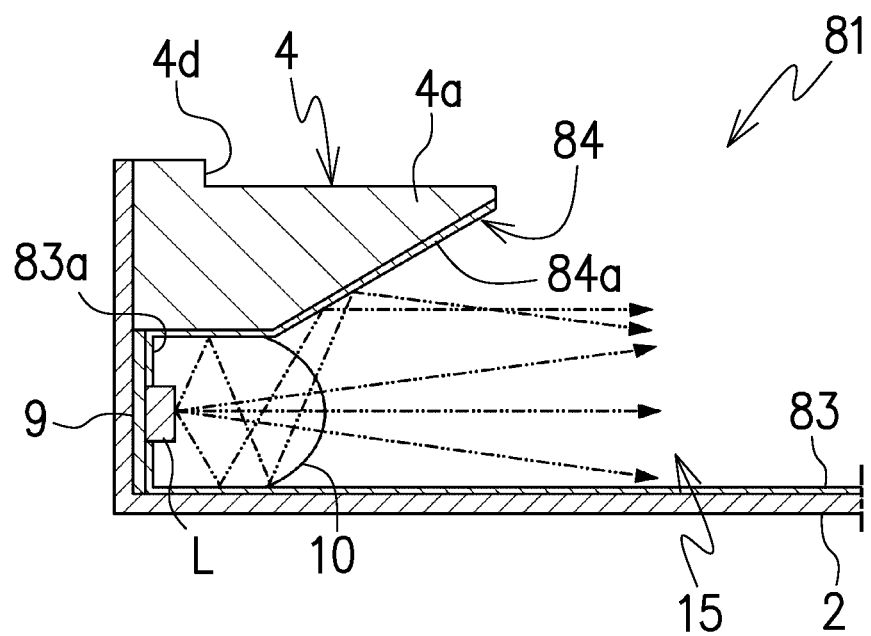
FIG. 12 is an enlarged partial sectional view showing a portion where a plurality of light sources with a lens provided in front of the light sources between a first reflecting surface and a second reflecting surface.

FIG. 12 illustrates a planar light-emitting device according to a ninth embodiment of the present invention.

The planar light-emitting device 81 in this embodiment differs from the first embodiment in that a second reflecting surface 84 is formed by folding upward a reflection sheet 83 constituting the first reflecting surface at an end close to the light source L and extending to the lower surface of the one side portion 4a of the support 4, and the second reflecting surface 84 includes an upward slope 84a. Other basic structures of the ninth embodiment are the same as in the first embodiment. In the planar light-emitting device 81 in this embodiment, a part of the folded reflection sheet 83 constitutes a reflection surface 83a adjacent to the flexible printed circuit board 9 by mounting the part on the flexible printed circuit board 9, on behalf of the reflection layer 12 on the front surface of the circuit board 9 in the first embodiment.

Consequently, in the planar light-emitting device 81 in this eighth embodiment, because the second reflecting surface 84 is formed integrally with the reflection sheet 83 constituting the first reflecting surface, part cost and assembly process can be reduced. In addition, because the part of the folded reflection sheet 83 functions as the reflection surface 83a formed integrally with the second reflecting surface 84 adjacent to the flexible printed circuit board 9, it is not necessary to prepare the reflection layer 12 separated from the printed circuit board 9, as shown in the first embodiment, thereby part cost and assembly process can be further reduced.

Although the several preferred embodiments of the present invention have been described, it should be understood that the present invention is not limited to these embodiments, without departing from the scope of the present invention, various modifications and changes can be made to the embodiments.

For example, although the planar light-emitting device in each of the aforementioned embodiments has been used as the backlight of the liquid crystal display device, the planar light-emitting device may be used for other uses as various planar light sources. In case of using the planar light-emitting device for a simple illumination, the optical sheet is not required.

Moreover, the second reflecting sheet is preferably provided on the support in each embodiment, but it may be provided on the bottom case or the front case.

Moreover, in each embodiment, the double faced adhesive tape is used to fix the outer circumferential portion of the diffusion sheet and the support, but other any adhesion or fixing devices or methods, for example, an adhesion agent or the like may be used.

Moreover, instead of the front case, a rim sheet may be used. The rim sheet is a double faced adhesive tape used to connect a liquid display panel and a backlight unit (planar light-emitting device) and having a function of light shielding and reflection.

Furthermore, the collimator lens focuses the light emitted from the light sources, but a shape of the collimator lens may be improved in such a manner that directivity is non-symmetrical, and thereby the brightness can be increased.

Figure 13:
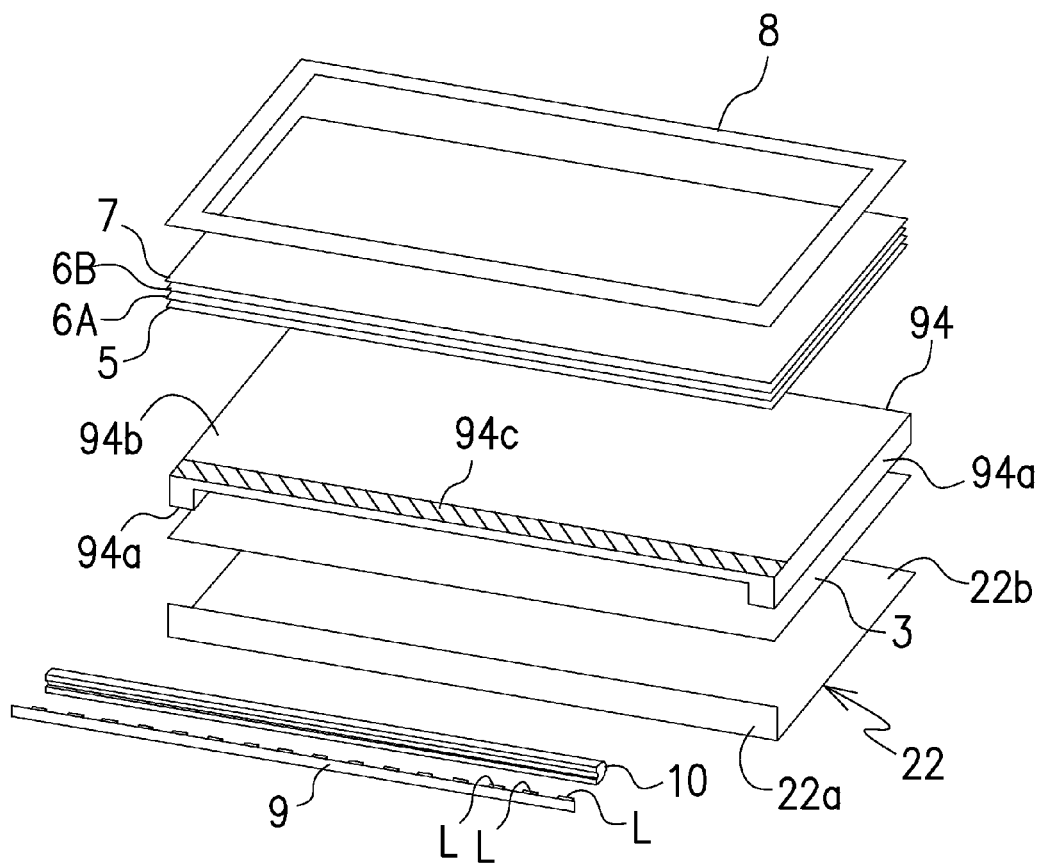
FIG. 13 shows an exploded perspective view of a planar light-emitting device according to the ninth embodiment of the present invention, especially showing a modified exemplification of a rectangular support including a plate shape instead of frame shape in plan view.

In addition, in each embodiment, the support 4 is the supporting frame extending along the outer circumferential portion of the diffusion sheet 5, but it may be a supporting member 94 formed by a pair of lower protruding portions 94a configured to protrude on opposite sides of the supporting member 94 facing the first reflecting surface 3 and a transparent plate 94b bridged between the pair of lower protruding portions 94a and disposed at an interval from the first reflecting surface 3, as shown in FIG. 13.

That is to say, in this case, the support 94 is made of a resin material such as acryl resin and so on, and light is irradiated through the transparent plate 94b to the diffusion sheet 5. Here, a reflection tape such as a white color tape or silver tape as a light-shielding part 94c is attached to one side of the support 94 facing the lens 10 and the light sources L. The light-shielding part 94c functions as the second reflecting surface by forming an upward slope on a back surface of the light-shielding part 94c.

The support 94 as formed as mentioned above has a high rigidity because the transparent plate 94b supports not only the outer circumferential portion of the first reflecting surface 3, but also the entirety of the support 94, and because light transmits the transparent plate 94b made of a transparent material and the transparent plate has little attenuation of the light, the brightness of the light can be prevented from being reduced. As shown in FIG. 13, the bottom case 22 is formed only by one rising wall surface 22a to which the flexible printed circuit board 22a is attached and a bottom surface 22b on which a reflection sheet for the first reflecting surface 3 is mounted.

What is claimed is:

1. A planar light-emitting device comprising:
a first reflecting surface;
a rectangular support disposed adjacent to the first reflecting surface;
light sources each including a light-emitting surface and disposed along, at least one side portion of the rectangular support; and
a lens including a light-receiving surface disposed to face the light-emitting surfaces of the light sources, and configured to introduce light emitted from the light sources into a space that is demarcated by at least the first reflecting surface and the rectangular support,
the rectangular support including a frame shape with an opening that passes through an upper surface and a lower surface of the rectangular support, and including a cut portion that is disposed at and extends along a lower edge of the at least one side portion of the rectangular support.

2. The planar light-emitting device according to claim 1:
further comprising a second reflecting surface disposed at the cut portion on the lower surface of the at least one side portion of the rectangular support.

3. The planar light-emitting device according to claim 2:
wherein the lens with the light-receiving surface disposed to face the light-emitting surfaces of the light sources is disposed at the cut portion under the second reflecting surface, and the second reflecting surface extends over a tip of the convex portion of the lens.

4. The planar light-emitting device according to claim 1:
wherein the first reflecting surface includes a downward slope disposed at an area that is along the at least one side portion of the rectangular support and adjacent to lower portions of the light sources and the lens, and
wherein the downward slope of the first reflecting surface slants downward.

5. The planar light-emitting device according to claim 2:
wherein the second reflecting surface includes an upward slope disposed at an area that is along the at least one side portion of the rectangular support and adjacent to upper portions of the light sources and the lens, and wherein the upward slope of the second reflecting surface slants upward toward the upper surface of the frame adjacent to the opening of the frame.

6. The planar light-emitting device according to claim 1:
wherein the first reflecting surface includes a downward slope disposed at an area that is along the at least one side portion of the rectangular support and adjacent to lower portions of the light sources and the lens, and wherein the downward slope curves.

7. The planar light-emitting device according to claim 2:
wherein the second reflecting surface includes an upward slope disposed at an area that is along the at least one side portion of the rectangular support and adjacent to upper portions of the light sources and the lens, and wherein the upward slope slanting upward toward the upper surface of the frame adjacent to the opening curves.

8. The planar light-emitting device according to claim 1:
further comprising at least one optical sheet disposed on the upper surface of the rectangular support and enclosing the opening of the rectangular support over the first reflecting surface.

9. The planar light-emitting device according to claim 1:
the light sources and the lens being disposed at the cut portion between the lower surface of the rectangular support and the first reflecting surface.

10. The planar light-emitting device according to claim 6:
wherein the downward slope of the first reflecting surface includes a curvature that gradually decreases with distance from the light sources and the lens toward an interior of the space that is demarcated by at least the first reflecting surface and the rectangular support.

11. The planar light-emitting device according to claim 7:
wherein the upward slope of the second reflecting surface includes a curvature that gradually decreases with distance from the light sources and the lens toward an interior of the space that is demarcated by at least the first reflecting surface and the rectangular support.

12. The planar light-emitting device according to claim 1:
wherein the first reflecting surface includes a bending surface that extends along the at least one side portion of the rectangular support to be a second reflecting surface disposed at the cut portion on the lower surface of the rectangular support.

13. The planar light-emitting device according to claim 1:
wherein the light sources each including a light-emitting diode element are disposed on a circuit board, and peripheral side surfaces of the light-emitting diode element are covered by a reflecting layer.

14. The planar light-emitting device according to claim 1:
wherein the rectangular support is made of white resin.

15. A planar light-emitting device comprising:
a first reflecting surface;
a rectangular support disposed adjacent to the first reflecting surface;
light sources each including a light-emitting surface and disposed along, at least one side portion of the rectangular support; and
a lens including a light-receiving surface disposed to face the light-emitting surfaces of the light sources, and configured to introduce light emitted from the light sources into a space that is demarcated by at least the first reflecting surface and the rectangular support,
the rectangular support including a transparent plate in top plan view, a cut portion that is disposed at and extends along a lower edge of the at least one side portion of the rectangular support, and a pair of lower protruding portions that are disposed at opposite lower edges of the rectangular support and extend from opposite ends of the cut portion and extend perpendicular to the cut portion.

16. The planar light-emitting device according to claim 15:
the transparent plate of the rectangular support including a light-shielding portion along the at least one side portion along that the light sources are disposed.

17. The planar light-emitting device according to claim 1:
wherein the lens is a collimator lens.

18. The planar light-emitting device according to claim 1
wherein the lens is a collecting lens.

19. The planar light-emitting device according to claim 8:
the at least one optical sheet including a diffusion sheet.

20. The planar light-emitting device according to claim 1:
the first reflecting surface including a reflecting sheet.

21. The planar light-emitting device according to claim 1:
the second reflecting surface including a concave surface that is disposed above at least one of the light sources.

* * * * *